(12) United States Patent
Dicander

(10) Patent No.: US 11,506,498 B2
(45) Date of Patent: Nov. 22, 2022

(54) METHOD AND A SYSTEM FOR ESTIMATING THE GEOGRAPHIC POSITION OF A TARGET

(71) Applicant: SAAB AB, Linkoeping (SE)

(72) Inventor: Fredrik Dicander, Moelndal (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/642,083

(22) PCT Filed: Aug. 31, 2017

(86) PCT No.: PCT/SE2017/050868
§ 371 (c)(1),
(2) Date: Feb. 26, 2020

(87) PCT Pub. No.: WO2019/045609
PCT Pub. Date: Mar. 7, 2019

(65) Prior Publication Data
US 2020/0208978 A1    Jul. 2, 2020

(51) Int. Cl.
*G01C 21/00*    (2006.01)

(52) U.S. Cl.
CPC ................... *G01C 21/005* (2013.01)

(58) Field of Classification Search
CPC ....... G01S 15/66; G01S 7/003; G01C 21/005; G01C 23/00; G06V 20/52; F41J 2/02
See application file for complete search history.

(56) References Cited

U.S. PATENT DOCUMENTS 4,659,089 A * 4/1987 Rosa .................... F41J 2/02
342/9

2003/0158744 A1    8/2003 Moitra et al.
(Continued)

FOREIGN PATENT DOCUMENTS

| GB | 2402284 A | 12/2004 |
|---|---|---|
| KR | 10-2015-0053603 A | 5/2015 |

OTHER PUBLICATIONS

International Searching Authority, International Search Report and Written Opinion for International Application No. PCT/SE2017/050868, dated Jun. 21, 2018, (14 pages), Stockholm, Sweden.

(Continued)

*Primary Examiner* — Catherine T. Rastovski
*Assistant Examiner* — Kaleria Knox
(74) *Attorney, Agent, or Firm* — Alston & Bird LLP

(57) ABSTRACT

The invention concerns a system (100) and a method for estimating the geographic position of a target (1). The method comprises the following steps: detecting a target (1); determining the characteristics of the target (1), which characteristics at least comprise a geographic position (3) and a category of the target; tracking the detected target (1) until at least one certain predetermined criteria is not fulfilled, wherein said criteria is associated to the level of certainty for determining the geographic position (3) of the target (1). The method further comprises determining a first point in time $t_1$ when the predetermined criteria was last fulfilled, wherein, for a second point in time $t_2$ the following step is performed: creating a pattern (2) defining at least one possible geographic position (3) of the target (1), said pattern (2) extends at least partially around the geographic position (3) of the target (1) at $t_1$, wherein the dimension of said pattern (2) is determined based on at least one predetermined parameter.

15 Claims, 5 Drawing Sheets

(56) References Cited

U.S. PATENT DOCUMENTS

| | | |
|---|---|---|
| 2006/0041381 A1 | 2/2006 | Simon et al. |
| 2006/0239559 A1* | 10/2006 | Maris .................. G01S 15/66 |
| | | 382/183 |
| 2009/0195401 A1 | 8/2009 | Maroney et al. |
| 2010/0017046 A1* | 1/2010 | Cheung .................. G01S 7/003 |
| | | 701/2 |
| 2010/0201787 A1 | 8/2010 | Zehavi |
| 2011/0246156 A1 | 10/2011 | Zecha et al. |

OTHER PUBLICATIONS

International Preliminary Examining Authority, International Preliminary Report on Patentability for International Application No. PCT/SE2017/050868, dated Dec. 20, 2019, (14 pages), Stockholm, Sweden.

European Patent Office, Extended European Search Report received for Application No. 17923423.2, dated Mar. 3, 2021, 9 pages, Germany.

Korean Patent Office, Korean Preliminary Rejection received for Application No. 10-2020-7009253, dated Mar. 16, 2022, 5 pages.

Korean Intellectual Property Office, Notice of Preliminary Rejection received for Application No. 10-2020-7009253, dated Jul. 22, 2022, 8 pages, South Korea.

\* cited by examiner

METHOD AND A SYSTEM FOR ESTIMATING THE GEOGRAPHIC POSITION OF A TARGET

CROSS REFERENCE TO RELATED APPLICATIONS

This application is a National Stage Application, filed under 35 U.S.C. § 371, of International Application No. PCT/SE2017/050868, filed Aug. 31, 2017; the contents of which are hereby incorporated by reference in their entirety.

BACKGROUND

Related Field

The described invention is a method and a system for estimating the geographic position of a target.

DESCRIPTION OF RELATED ART

When surveilling a geographic area of interest, it is important to determine whether a target is in the area. Once a target has been detected in the area, a sensor in a sensor system surveilling the area may track the target in order to follow the target in the area. If the target is lost, for example due to the incapability of the sensor to detect the target under a certain condition, the target may still reside in the area of interest, but it is unknown to the sensor surveillance system, where in the area the target resides. Different sensors have different capabilities of detecting targets. Hence, a sensor system may comprise a sensor capable to detect the target in the area, but that certain sensor may be arranged to scan a different geographic area. In order to be able to redetect a target which is lost in the geographic area of interest, the sensors of the sensor systems are manually controlled, that is, a skilled person decides what areas the sensors of the sensor system should scan and at what times. This planning of the resources of the sensor system may be done continuously and/or in a fixed or pre-planned way.

To manually control sensors of a sensor system for detecting targets requires skills and time.

In cases where the sensor systems are used to redetect a previously detected target, the geographic area in which the target most likely resides, which geographic area is to be scanned by a sensor, is often predicted manually along potential "escape routes" for the targets. To determine these escape routes is time consuming and requires skill from the person controlling the sensor system.

In order to use the sensors of the system in an efficient manner it is important to focus the scanning efforts of each sensor of the sensor system to relevant areas. Manual scanning planning methods have limitations in how to take previous scanning efforts of non-perfect sensor detection and the movements of the targets into account in this planning. In cases where several targets need to be redetected in the same area the manual planning gets even more challenging given even larger needs for automation.

Hence, there is a need for an efficient method for controlling a sensor system in order to optimize the resources of the sensor system and also to be able to redetect targets in a geographic area of interest.

BRIEF SUMMARY

It is an object of the present invention to provide an improved method of controlling a sensor surveillance system.

It is an object of the present invention to provide an alternative method for controlling a sensor surveillance system.

It is an object of the present invention to provide an efficient method of controlling a sensor surveillance system.

It is an object of the present invention to provide an improved method for estimating the geographic position of a target.

It is an object of the present invention to provide an alternative method for estimating the geographic position of a target.

It is an object of the present invention to provide an improved system for estimating the geographic position of a target.

It is an object of the present invention to provide an alternative system for estimating the geographic position of a target.

It is an object of the invention to provide an efficient method and system for estimating the geographic position of a target.

It is an object of the invention to provide an accurate method and system for estimating the geographic position of a target.

The invention relates to a method for estimating the geographic position of a target.

According to one example a method for estimating the geographic position of a target is presented. The method comprises the following steps: detecting a target; determining the characteristics of the target, which characteristics at least comprise a geographic position and a category of the target; tracking the detected target until at least one certain predetermined criteria is not fulfilled, wherein said criteria is associated to the level of certainty for determining the geographic position of the target; and determining a first point in time $t_1$ when the predetermined criteria was last fulfilled. Further, for a second point in time $t_2$ the following step is performed: creating a pattern defining at least one possible geographic position of the target, said pattern extends at least partially around the geographic position of the target at the first point in time, wherein the dimension of said pattern is determined based on at least one predetermined parameter.

According to one example, the geographic position of a target is a position in a three dimensional geographic volume. According to one aspect, the geographic position of a target is a position in a two dimensional geographic area.

The target may, according to one aspect, be an airborne object, a land borne object or a waterborne object. The waterborne object may be arranged to travel on the surface of the water or below the surface of the water.

The characteristics of the target relate according to one example to the category of target, such as type of target, for example bus, car, submarine etc. and/or the current speed and/or the current acceleration and/or the direction of movement of the target. Further, according to one example the category of the target relate to a signature relevant for sensor detection, for example: type of vehicle, a certain number of vehicles in a group of vehicles, a person or a certain number of persons in a group of persons. According to one example, the category of the target comprises further features describing the target, such as "red pickup truck" and/or "license plate ABC123" and/or "two passengers and a broken window". According to one example, if the sensor of a surveillance sensor system detects a target at a geographic position, but is not able to detect enough information about the target in order to be able to categorize the type of target, the target is categorized as unknown.

The first point in time is the point in time when the geographic position of the target is last detected. In other words, the first point in time is the last point in time when a certain level of certainty for determining the geographic position of the target is fulfilled.

The second point in time is the point in time for which point in time a pattern defining at least one possible geographic position of the target is generated or created. By using the described method, an accurate estimation of the geographic position of a target at a second point in time is achieved. The method thus enables a more accurate estimation of the geographic position of a target than previously described methods. Hence the method provides for a better decision support for decisions where a possible geographic position of a target is a parameter to be considered.

By using the described method, an accurate overview of the possible positions of targets in a certain surrounding at a certain point in time is created. According to one example, the method is used in order to control and/or optimize a surveillance sensor system. According to one example, the method is used in order to create safe routes for an object travelling in the geographic area of interest.

According to the described method, a pattern is created or generated, wherein the pattern defines at least one possible geographic position of the target at a second point in time. By using the described method, the pattern covering possible geographic positions of the target is created or generated based on at least one predetermined parameter. Thereby an accurate estimation of the geographic position of the target at a second point in time is created. According to the described method, a more accurate estimation of the geographic position of a target at a second point in time is achieved, compared to currently known methods of estimating the geographic position of a target at a certain point in time.

According to one example said at least one predetermined parameter, which the dimension of said pattern is based on are: the category of the target; the characteristics of the surrounding of the geographic position where the target was detected at said first point in time; and a time difference between the first point in time $t_1$ and the second point in time $t_2$ for which the pattern is created.

According to one example said at least one predetermined parameter is a level of surveillance of the surrounding of the geographic position of the target at said first point in time $t_1$.

By using the parameters mentioned above when creating a pattern defining possible positions of a target, an accurate estimation of possible geographic positions of the target is created. In other words, the pattern created is as small as possible, but at the same time covering all the possible geographic positions of the target. By using the parameters above, certain geographic positions can be excluded from being covered by the pattern since it is not possible that the target is situated at that geographic position. For example, if the target is of a category which cannot travel in a certain terrain, such as for example forest, the pattern will not extend in a forest, and hence, the pattern is kept small. According to one example, the level of surveillance of the surrounding of the geographic position of the target at said first point in time $t_1$ is used in order to minimize the pattern. If one of the sensors of the sensor surveillance system is scanning geographic positions in the surrounding of the geographic position of the target at said first point in time $t_1$, the pattern will not extend in those scanned geographic positions.

Hence, one goal of the invention is to keep the pattern as small as possible, but still cover all possible geographic positions where the target could possibly reside at the second point in time.

According to one aspect, each category of target is associated with maximum/minimum speed and maximum/minimum acceleration. According to one aspect, the category of the target is associated with a mobility of the target, that is, the ability of the target to move in a certain surrounding. According to one aspect, the category of the target is associated with a maximum/minimum speed and maximum/minimum acceleration in a surrounding with certain characteristics.

According to one aspect, the characteristics of the surrounding of the geographic position where the target was detected at said first point in time could be the type of terrain of the surrounding such as meadow, forest, mountains, precipices, roads, swamps, topography of the land. According to one example, the characteristics of the surrounding comprise any of: type of terrain, weather such as wind or clouds, currents in water, topography of the sea bed etc.

According to one example, a pattern defining possible geographic positions of the target is created or generated. According to one example, the pattern is created based on information regarding the time difference between the first point in time and the second point in time for which the pattern is created. Hence, a pattern created for one second point in time may be different form a pattern created for another second point in time due to the possible movement of the target during the time period between the first point in time and a second point in time for which the pattern is created.

Hence, for example, if the target is a car, and the car is not able to move in a forest area but the car is able to move in a meadow area at a maximum speed of 30 km/h, and the geographic position of the target at the first point in time is surrounded by forest and a meadow, the pattern will not extend in the forest area, but only over the meadow area. The pattern will grow at each subsequent point in time for which point in time the pattern is created if the car is assumed to be moving. The growth of the pattern between subsequent points in time will consist of the area in which it is possible that the car has moved with an estimated speed of the target in the specific terrain surrounding the geographic position of the car at said first point in time.

According to one example, a level of surveillance of the surrounding of the geographic position where the target was detected at said first point in time is affecting the pattern created. The level of surveillance is according to one example associated to the type and number of sensors of a surveillance sensor system scanning the surrounding.

In order to perform the method described, a sensor system comprising a number of sensors is arranged to scan a certain area of interest. The sensors are according to one example of different types, such as radar, IR-sensor, etc. Each type of sensors has its own characteristics. The sensor characteristics affect the capability of the sensors to detect a target and/or to determine a non-existence of a target in a certain area. The ability of the sensors to detect a target or to determine a non-existence of a target in a certain area may also depend on other parameters such as the terrain, visibility, weather, type of target etc. According to one example, a sensor is able to determine non-existence of a target in a certain area to a higher degree of certainty, than to detect the existence of a target in the certain area. The information about the non-existence of a target in a certain area or volume of interest is used when creating the pattern. If a target is not present in an area or volume, the pattern will not cover that volume or area. Hence, by using information from the sensors regarding non-existence of a target the extension of the pattern can be limited, and hence a more accurate estimation of a possible position of a target is achieved.

According to one example of the described method, information from a number of sensors with different sensor qualities is merged together to better estimate the geographic position of a target, i.e. to create the pattern.

According to one example of the described method, information from sensors with few measurement dimensions but which sensors can detect a non-existence of a target in a surrounding, such as sound sensors or magnetic sensors, is used to improve the estimation of the geographic position of a target, that is, to create the pattern.

According to the described method a merge, or fusion of information from different sensors in the sensor surveillance system occurs. In addition to information from the sensors regarding detection of a target, also information regarding non detection of a target is used in order to create the pattern. Hence, an accurate pattern is created.

If many targets are situated in an area of interest, in order to not mix up the targets, a separation of the detections of a target is required. Targets are considered separated, if they have a distance compared to resolution and target manoeuvrability, in the area of interest where the sensor measurement is made. This separation requirement leads to unrealistic measurement rates, too hard timeliness requirements or prevents information from sensors with too few or wrong measurement dimensions to contribute to the estimation of the geographic position of the target.

According to the described method, when the sensors of the system do not detect a target in said surrounding, and when this information about the non-existence of a target in the surrounding is reliable to a certain level, the pattern does not extend in that surrounding. In other words, for a surrounding surveilled by a sensor which is capable to determine that a target is not situated in a certain geographic position to a certain level of certainty, the pattern will not cover said surrounding.

According to one example, if a target is detected in the surrounding and the geographic position of said target is determined and the category of said target can be determined by the sensor, a tracking process is initiated, and hence, no pattern is created until the sensor can no longer detect the position of the target.

According to one example, if a target is detected in the surrounding and the geographic position of said target is determined and the category of said target can be determined by the sensor, and the target is identified as a target around which a pattern has previously been created, that is, the target is redetected, the whole pattern around the geographic position where the target was detected in said first point in time is removed, and a new tracking process of the target is initiated. A new pattern will not be created until the sensor can no longer detect the position of the target.

If the sensor of the sensor surveillance system does not detect a target in the surrounding, the pattern does not extend in that surrounding since it is then determined that no target is present in the surrounding.

According to one example the probability that a sensor of a sensor surveillance system will detect an existing target in a surrounding depend on the terrain of the surrounding, weather conditions, type of target etc. One sensor of a sensor surveillance system could for example detect moving targets not covered by tree foliage to a high degree. Hence, when this sensor scans an area not covered by tree foliage, the pattern will not extend in that area since the sensor will either detect an existing target in the area and hence a tracking process will start, or, alternatively, the sensor will be able to determine that there is not target in the area, and hence the pattern will not extend in the area which is scanned by the sensor.

By using the at least one of the predetermined parameters mentioned above as a basis for the determined pattern, an accurate pattern of possible geographic positions of the target is achieved. Hence, a reliable and accurate decision support is achieved, which decision involves information regarding the possible geographic position of a target.

According to one example, the method further comprises the following step:

calculating a probability of the presence of the target associated to each geographic position in the pattern at said second point in time.

According to one aspect, each geographic position in the pattern is associated with a certain probability, wherein said probability describes the probability that the target is situated at that specific geographic position undetected.

According to one example, if the detected target is categorized as a car which is capable of travelling on a road but also on a meadow if necessary, the probability that the car will travel on a road may according to one example be larger than the probability that the car will travel on a meadow, and hence, the probability that the car is on the road is larger than the probability that the car is on the meadow. The parameters for calculating the probability of the possible position of the target may be adjusted according to a number of parameters for example the terrain of the surrounding, weather etc. According to one example the probability calculation can be adjusted in a similar way to take into account known intentions or tendencies (higher probabilities) for a target to move in a certain direction.

According to one example, the probability calculation takes the characteristics of the sensors into account, that is, the information received from the sensors regarding non-existence of a target in a certain area is associated with a certain probability depending on the characteristics of the sensor and/or the type of surrounding surveilled by the sensor. For example, a certain type of sensor, such as radar, gives information to the system that no target exists in a certain surrounding. If this surrounding is a surrounding where it is known that a radar sensor is able to detect a target to a high level or certainty, the information from the sensor is graded as being reliable to a high degree, and hence, the probability that a target is existing in that particular area is low. If however, the surrounding is a surrounding where it is known that a radar sensor has difficulties to give reliable information from, than the information that no target exists in that area is not graded as being very reliable, and hence, there is a larger possibility that a target does exist in the area.

By calculating a probability of the presence of the target associated to each geographic position in the pattern for said second point in time, an even more accurate and reliable decision support may be achieved, where the decision to be made involves information regarding the possible geographic position of a target.

According to one example at least one sensor of a sensor surveillance system is controlled based on the created pattern. According to one example, at least one sensor of a sensor surveillance system is controlled based on at least one created pattern.

According to one example, the method is used to control sensors of a sensor surveillance system. A sensor of the surveillance sensor system, which sensor is capable of detecting a target in a specific surrounding to a high degree of certainty is according to one example controlled to search or scan a surrounding in which it is possible that a target is situated. In other words, a sensor of the system may be controlled to search a surrounding covered by a pattern defining at least one possible geographic position of the target. If the sensor does not detect a target in said surrounding, the pattern is according to one example deleted from that surrounding. According to another example, the pattern is adjusted so that the probability that a target is positioned in said searched area is lowered.

Alternatively, a sensor of a certain type which sensor is not able to determine a target in a certain surrounding to a high degree of certainty, could be controlled to search an area where a reliable result from the scanning can be received, where said area is situated near by a certain surrounding where pattern is existing. If the target then enters the area surveilled by the sensor, the sensor will be able to detect the target. In addition, the pattern will not extend in the area surveilled by the sensor and hence, the size of the pattern can be limited. Hence, information from a sensor which is not able to detect a target to a high degree of certainty in a certain surrounding, but which can detect the non-existence of a target to a high degree of certainty is utilized in order to get a more accurate pattern.

In addition, the resources of a sensor system may according to one example be utilized more efficiently utilizing the described method, and hence a cost efficient usage of a sensor system may be achieved. The advanced sensors being able to detect a target in a difficult surrounding may be utilized to scan such surroundings only where a pattern is existing, and hence, the resources of the sensor surveillance system is used more efficiently.

According to one example a sensor able to detect a target in a surrounding of a certain characteristics is controlled to scan said surrounding, at least at said geographic positions where a pattern of a target is present.

According to one example, a sensor capable to detect a target in a surrounding of a certain characteristics, which surrounding is covered by a pattern, is controlled or directed to scan said surrounding. If the sensor detects a specific target previously detected and around which a pattern has been created, the target is considered to be redetected. The pattern created for the target is deleted, and the tracking process starts again. If the sensor detects a target in a certain surrounding but the sensor cannot determine if the detected target corresponds to a target previously detected, the pattern will remain undisturbed in that surrounding or resolution cell. Hence, that surrounding will still be covered by the pattern, and hence the surrounding is a possible target location. If the sensor does not detect a target, the pattern in the scanned surrounding is deleted if the sensor is capable to detect a target in the specific surrounding. The dimensions of the pattern are adjusted since the scanned surrounding does no longer form possible geographic positions of the target. Accordingly, an even more accurate pattern defining possible geographic positions of the target is achieved. According to one example, several patterns can be updated in parallel representing multiple targets in the same area.

According to one example a route for an object is planned based on the created pattern.

According to one example, the method is used in order to plan a route of an object in a surrounding. The route is according to one example planned in order to move the object from one geographic position to another geographic position in the safest way, avoiding possible targets in the surrounding. Since the described method provides a pattern which is accurate, a secure route for the object can be planned by planning the route for the object based on the pattern.

According to one example a route for an object is planned in order to minimize the probability of entering a pattern around a target, or in order to minimize the probability of being within a certain distance from a target or in order to minimize the probability of encountering a target.

By using the described method, an optimal route for an object starting form one geographic position to another geographic position can be created, said route being based on patterns defining at least one possible geographic position of targets in the geographic area in question.

According to one example the geographic positions of a pattern for a target are related to a grid.

By relating the geographic positions of a pattern to a grid, a clear and user friendly presentation of the pattern is obtained.

According to one example a system for estimating the geographic position of a target is described. The system comprises: at least one sensor arranged to detecting a target; at least one sensor arranged to track the detected target until at least one certain predetermined criteria is not fulfilled, wherein said criteria is associated to the level of certainty for determining the geographic position of the target; and fulfilment determination circuitry arranged to determine a first point in time $t_1$ when the predetermined criteria was last fulfilled; characteristic determination circuitry arranged to determine the characteristics of the target, which characteristics at least comprises the geographic position and a category of the target, and pattern creation circuitry arranged to, for a second point in time $t_2$, perform the following step: creating a pattern defining possible geographic positions of the target, said pattern extends at least partially around the geographic position of the target at the first point in time $t_1$, wherein the dimension of said pattern is determined based on at least one predetermined parameter.

The system enables a more accurate estimation of the geographic position of a target than previously described systems. Hence the system provides for a better decision support for decisions where a possible position of a target is a parameter to be considered.

By using the described system, an accurate overview of the possible targets in a certain surrounding at a certain point in time is created. According to one example, the system is used in order to create safe routes for an object travelling in the surrounding.

According to the described system, a pattern is created wherein the pattern defines at least one possible geographic position of the target. By using the described system, the area where a target may be situated, i.e. the pattern, is decreased compared to currently known systems for estimating the geographic position of a target.

According to one example the predetermined parameter on which the dimensions of the pattern is based comprises: the category of the target, the characteristics of the surrounding of the geographic position where the target was detected at said first point in time; a time difference between the first point in time and the second point in time for which point in time the pattern is created.

According to one example the predetermined parameter further comprises: a level of surveillance of the surrounding of the geographic position of the target at said first point in time.

By using the at least one of the predetermined parameters mentioned above as a basis for the determined pattern, an accurate pattern of possible geographic positions of the target is achieved. Hence, a reliable and accurate decision support is achieved, which decision involves information regarding the possible geographic position of a target.

According to one example the system further comprises probability calculator circuitry arranged to: calculate a probability of the presence of the target associated with each geographic position in the pattern at said second point in time.

By calculating a probability of the presence of the target associated to each geographic position in the pattern for said second point in time, an even more accurate and reliable decision support may be achieved, which decision to be made involves information regarding the possible geographic position of a target.

According to one example the system comprises sensor controlling circuitry arranged to control at least one sensor of the system based on the created pattern.

The resources of the sensor system may according to one example be utilized more efficiently by controlling at least one sensor of the system based on the created pattern. Hence, an efficient sensor system may be achieved.

According to one example at least one sensor able to detect a target in a surrounding of a certain characteristics is controlled to scan said surrounding, at least at said geographic positions where a pattern of a target is present. According to one example the probability calculation circuitry is arranged to update several patterns representing different targets within the same area. According to one example the sensor controlling circuitry is arranged to control one or more sensors to redetect several targets using their corresponding patterns.

By controlling a sensor of the system to scan said surrounding, at least at said geographic positions where a pattern of a target is present, an even more accurate pattern defining possible geographic positions of the target remains, improving the decision support further.

According to one example the system comprises means arranged to plan a route for at least one object based on the created pattern.

By using the described system in order to plan a route for an object, a secure planning of the route is enabled, and hence, a safe route is planned.

According to one example a route for an object is planned in order to minimize the probability of entering a pattern around a target, or in order to minimize the probability of being within a certain distance from a target, or in order to minimize the risk of encountering a target.

According to one example the system further comprises means arranged to relate the geographic positions of a pattern for a target to a grid.

BRIEF DESCRIPTION OF THE FIGURES

For a further understanding of the present invention and its further objects and advantages, the detailed description set out below should be read in conjunction with the accompanying drawings, in which the same reference notations denote similar items in the various diagrams, and in which.

The term "link" refers herein to a communication link which may be a physical connection such as an opto-electronic communication line, or a non-physical connection such as a wireless connection, e.g. a radio link or microwave link.

Figure 1:
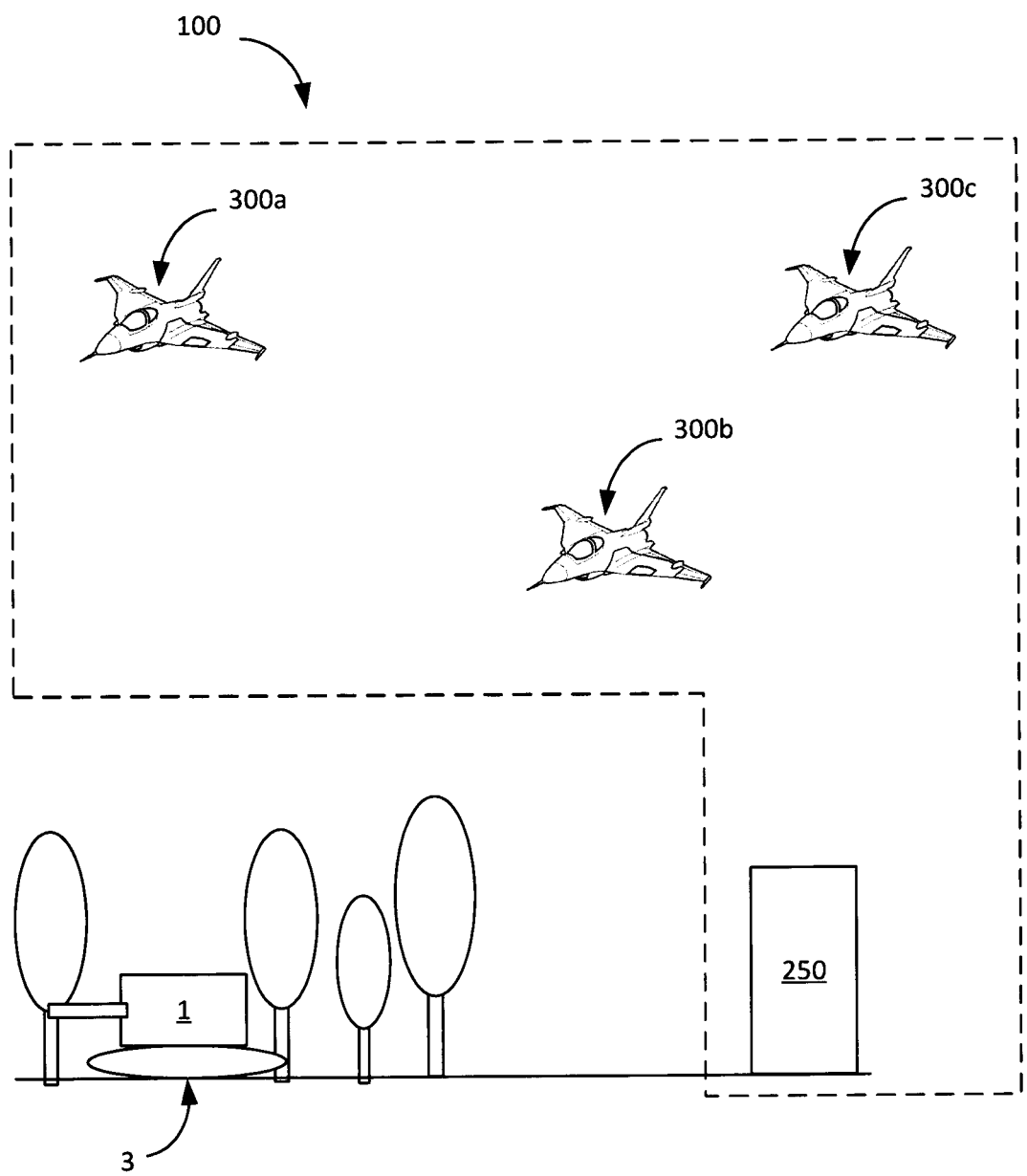
FIG. 1 illustrates an overview of a system according to one example of the disclosure.

FIG. 1 schematically illustrates a system 100 for estimating the geographic position of a target 1, and a target 1 according to one example. The system 100 comprises sensors 300a, 300b, 300c arranged to scan a certain surrounding. The sensors are arranged to detect and track a target 1. The system 100 comprises a central control unit 250. The sensors 300a-300c is according to one example of the same type. Alternatively, the sensors 300a-c is different types of sensors. The sensors 300a-c can be of any type capable of detecting a target, such as for example radar sensors, optical sensors, audio sensors etc. According to the illustrated example, the sensors 300a-300c is attached to aircrafts. However, the sensors 300a-300c of the system 100 may be arranged on other vehicles such as drones, land borne vehicles, waterborne vehicles etc. or alternatively be attached to a stationary structure such as a mast or building, stationary cameras etc. According to one embodiment not illustrated, a sensor is a human.

In the illustrated example, a target 1 has been detected by one of the sensors 300a of the sensor surveillance system 100. The sensor 300a has determined the category of the target 1 to be a tank. The information about the target 1 determined by the sensor 300a is communicated to the central control unit 250. The sensor 300a tracks the detected target 1 until the geographic position of the target 1 cannot be determined to a certain level of certainty. The last point in time when the geographic position was determined to a certain level of certainty was at a point in time $t_1$. At said point in time $t_1$, the geographic position 3 of the target 1 was determined by the sensor 300a. The target 1 is hence at a first point in time $t_1$ positioned at a geographic position 3.

According to one example, the sensors 300a-c communicates with the central control unit 250. The central control unit 250 may be a separate unit situated in for example a building. According to one embodiment, not illustrated, the central control unit 250 is situated in a vehicle such as for example an aircraft. The central control unit 250 is arranged to control the sensors 300a-300c of the system.

According to one example not illustrated, the sensor is a human seeing a target 1. The human determines the point in time $t_1$ when the human can no longer see the target 1, and the human also determines the category of the target 1. The information regarding $t_1$ and the category of the target may be entered into the central control unit 250.

Figure 2:
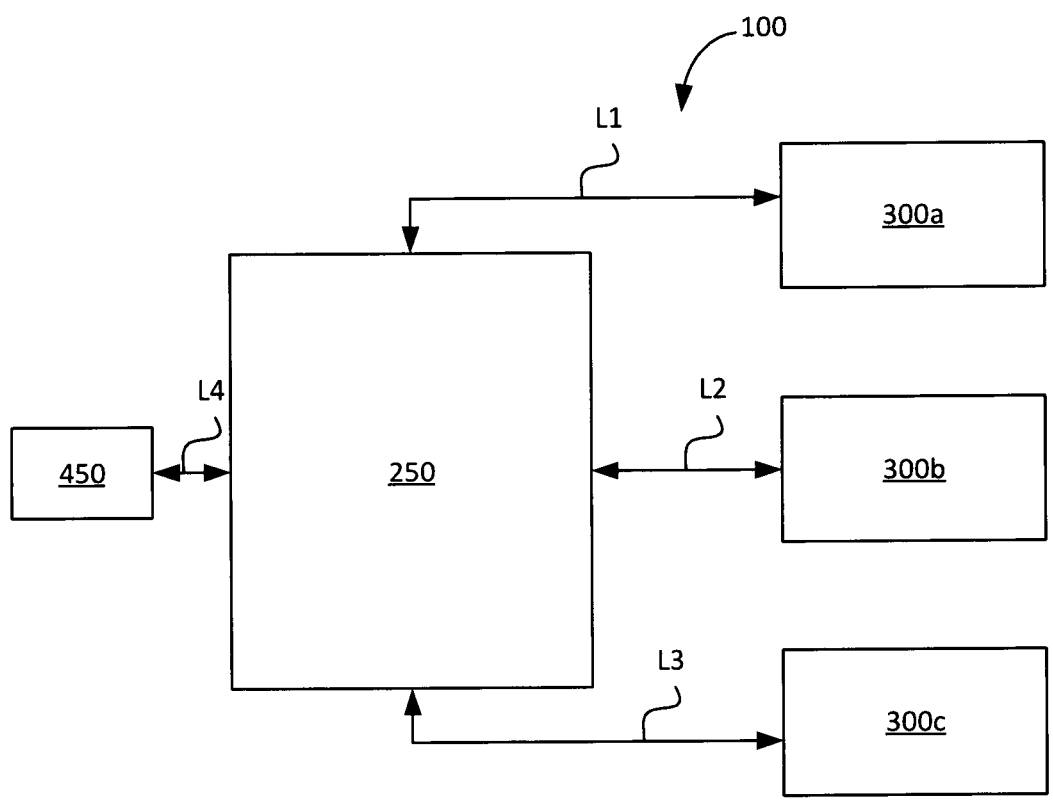
FIG. 2 illustrates a system according to one example of the disclosure.

FIG. 2 is a schematic illustration of a system 100 for estimating the geographic position of a target 1 according to one example. The system 100 comprises sensors 300a-c arranged to detect and track a target 1 and a central control unit 250 connected to each sensor 300a-c via a sensor link L1, L2, L3. According to the illustrated example, a user interface 450 is connected to the central control unit 250 via a user interface link L4. The system 100 may have some of or all of the characteristics as presented in relation to FIG. 1.

The sensors 300a-c are further described below. The sensors 300a-c may according to one example each comprise all the functionality described below. Alternatively, the sensors 300a-c together comprise the functionality as described below, and hence, all of the features described below may not be in each of the sensors 300a-c.

According to one example the sensor 300a-c, is arranged to detect a target 1 in a geographic volume if interest. The sensor 300a-c is according to one example arranged to track the target 1 and to determine the characteristics of the target 1. The characteristics of the target 1 comprise at least a geographic position 3 and a category of the target 1. The category of the target 1 is according to one example: type of vehicle such as car, tank, submarine, aircraft etc. The category of the target 1 comprises according to one example further details regarding the target 1, such as the colour of the target, number of people in the vehicle, or any other features that characterises the target such as "broken window" "license plate ABC123" etc. In addition, the category of the target 1 may include information regarding the direction and speed at which the target 1 is moving.

The category of the target 1 is, according to one example, defined in order to be able to verify the target 1 if/when it is redetected. In other words, the category of the target 1 is used to verify that the same target 1 as previously detected has been redetected. The defined category of the target 1 is according to one example utilized by the system 100 in order to receive further information regarding the target 1, such as the maximum speed of the target 1, the maximum acceleration of the target 1, the ability of the target 1 to move in a certain terrain etc. The further information regarding the target 1 may be received from the control unit 250 and/or the sensors 300a-c of the system 100. Alternatively, or in addition, the further information regarding the target 1 may be received from an external unit, such as an external database (not illustrated).The level of detail of the determined category of the target 1 which is determined by the sensor 300a-c may vary depending on the sensor 300a-c, such as the type of sensor 300a-c, the type of target 1, the speed of the target 1 and other external factors such as weather, terrain etc. In order to be able to determine a category of the target 1, a certain level of detail of the category of the target 1 has to be fulfilled. The system 100 controls the minimum level of detail of the category of the target 1. If a sensor 300a-c detects a target 1 but cannot categorize the target 1 to above the set minimum level of detail of the category of the target 1, the target 1 is not considered to be detected or alternatively, the target 1 is not categorized. The information regarding the category of the target 1 is according to one embodiment stored in the sensor 300a-c and/or in the central control unit 250. According to one embodiment, the information regarding the characteristics of the target 1 is communicated to a number of sensors 300a-c of the system 100 via links L1-L3.

According to one example, the sensor 300a-c is a category determining sensor 300a-c arranged to determine the category of the target 1 at one point in time during the tracking process of the target 1. However, it is not necessary that the category determining sensor 300a-c detects the category of the target 1 during the whole tracking process. Once the category of the target 1 has been determined by the category determining sensor 300a-c, the sensor 300a-c only has to determine the geographic position of the target 1 during the tracking process.

The category determining sensor 300a-c may further be arranged to track the detected target 1 until at least one certain predetermined criteria is not fulfilled, wherein said criteria is associated to the level of certainty for determining the geographic position 3 of the target 1. The level of certainty at which a sensor 300a-c is able to determine the geographic position of a target is dependent on for example the type of sensor 300a-c, the visibility in the surrounding such as in the air or in the water where the target 1 is situated, the terrain of the area surrounding the target 1, such as for example forest or swamp etc., obstructing objects, the type of target 1, the type of sensor 300a-c etc. The last point in time when the level of certainty is fulfilled, which point in time is referred to the first point in time $t_1$, is determined by the sensor 300a-c or by the central control unit 250 and registered in the system 100, in the central control unit 250 and/or in the sensor 300a-c. In addition, the geographic position 3 of the target 1 at said first point in time $t_1$ is determined by the sensor 300a-c or by the central control unit 250 and registered in the system 100, in the central control unit 250 and/or in sensor 300a-c.

The category determining sensor 300a-c is controlled by the central control unit 250 via the sensor link L1-L3. According to one embodiment, the central control unit 250 receives data from the characteristic determining sensor 300a-c and utilizes the data received in order to determine the characteristics of the target 1 or to derive other information from the data received from the category determining sensor 300a-c.

In the illustrated example, the system 100 comprises three sensors 300a-c. However, according to one embodiment, any number of sensors 300a-n and/or any types of sensors able to detect a target 1 and to determine the category and the geographic position of a target can be included in the system 100.

The central control unit 250 and/or the sensors 300a-c comprises, separately or in combination: fulfilment determination circuitry, characteristic determination circuitry, pattern creation circuitry, probability calculator circuitry and sensor controlling circuitry.

The central control unit 250 is arranged to, for a second point in time $t_2$ perform the following step: create a pattern defining possible geographic positions of the target 1, said pattern extends at least partially around the geographic position 3, where the target 1 was last detected, wherein the dimension of said pattern is determined based on at least one predetermined parameter.

According to one example the predetermined parameter comprise: the category of the target 1, the characteristics of the surrounding of the geographic position 3 where the target 1 was detected at said first point in time $t_1$, and a time difference between the first point in time $t_1$ and a second point in time $t_2$ for which point in time the pattern is created. According to one example the predetermined parameter further comprise a level of surveillance of the surrounding of the geographic position 3 of the target 1 at said first point in time $t_1$ Information regarding the level of surveillance of the surrounding of the geographic position of the target 1 at said first point in time $t_1$ is derived from the central control unit 250, possibly in combination with data from an external unit not illustrated. The level of surveillance depends on the number of sensors 300a-c in a certain geographic volume of interest, the type of sensors 300a-c, and the terrain of the surrounding of the geographic area of interest and the ability for the sensors to detect the target category etc.

According to one example, the time difference between the first point in time $t_1$ and the second point in time $t_2$ for which the pattern is created is determined by the central control unit 250.

According to one example, the central control unit 250 is arranged to communicate with at least one external unit (not illustrated) in order to retrieve information regarding the parameters, which parameters are used in order to determine the dimensions of the pattern. Said external unit may comprise a database with geographic information, weather information, water current information or other information regarding the surrounding of a target 1. In addition, the database of the external unit may comprise information regarding a category of a target 1 such as the ability of a certain target 1 to move in a certain terrain, maximum speed/acceleration of a certain target etc. According to one example, the central control unit 250 comprises some or all of the information as mentioned above. Said external unit may according to one example also comprise a database describing the ability for different sensor types to detect different category of targets in different types of terrain.

The central control unit 250 is according to one example connected to a user interface 450. The user interface 450 is according to one example arranged to receive or present data or instructions from/to a user. According to one example, a user can control a sensor 300*a-n* of the system 100 via the user interface 450.

According to one example, the central control unit 250 controls the sensors 300*a-c*. According to one example, the central control unit 250 controls the sensors 300*a-c* based on the created pattern. For example, if a pattern is covering a geographic area, and the geographic area is an area in which only a sensor 300*a-c* of a certain type can detect a target 1, such a sensor 300*a-c* able to scan the area of interest is controlled to scan said area.

According to one example the central control unit 250 determines a time schedule for each sensor 300*a-n* including a number of geographical positions which the sensor 300*a-n* is controlled to scan at certain points in time.

According to one example, the central control unit 250 is connected to another system (not illustrated) comprising sensors for estimating a geographic position of a target. The central control unit 250 is according to this example able to "borrow" a certain sensor from the other system for surveilling a certain geographic area.

According to one example, the central control unit 250 determines the first point in time $t_1$ based on data from the sensor 300*a-c*.

According to one example, the central control unit 250 and/or the sensor 300*a-c* is arranged to calculate a probability of the presence of the target 1 associated with each geographic position 3 in the pattern at said second point in time $t_2$.

According to one example, the central control unit 250 is arranged to be able to plan a route for an object based on the generated pattern. According to one example, the route for an object is planned in order to minimize the probability of entering a pattern around a target 1, or in order to minimize the probability of being within a certain distance from a target 1, or in order to minimize the risk of encountering a target 1.

According to one example, the central control unit 250 is arranged to relate the geographic positions of a pattern for a target 1 to a grid. A grid enables a user friendly presentation of a pattern.

Figure 3A:
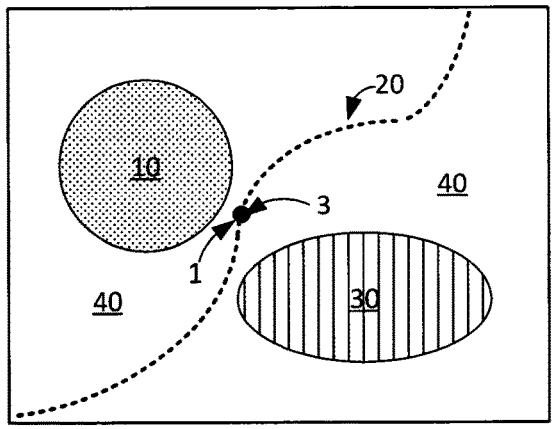
FIG. 3a illustrates a view of an area of land according to one example of the disclosure.

FIG. 3*a* illustrates a view of an area of land. In the illustrated area, a target 1 is present. The target 1 in this illustrated example is a land borne vehicle. The area is an area illustrated in two dimensions. The target 1 in this illustrated example is only able to move along the ground. The target 1 is situated on a road 20. The illustrated area of land comprises subareas 10, 30, 40 wherein the subareas comprise different types of terrain.

According to the illustrated example, the area 10 comprises forest, the area 30 is a swamp area and the area 40 is a meadow area.

The illustrated view comprises the target 1, which target 1 has been detected by a sensor 300*a-c* of a system 100, and the surrounding area at a first point in time $t_1$.

According to one example of the illustrated example, the sensor 300*a-c* has categorized the target 1 as a car. According to one example, the central control unit 250 comprises a database comprising information about different categories of targets 1. According to one example, the information in the central control unit 250 for the target category "car" comprises information that the car is able to travel on a road 20 at a maximum speed of 90 km/h. In addition, according to the information in the central control unit 250, the car is not able to travel in a forest area 10, but is able to travel in a swamp area 30 and a meadow area 40 at a maximum speed of 10 km/h. The further information about the category of the target 1, such as ability to move in certain terrains, maximum speed etc. is according to one example derived from an external database, not illustrated.

The sensor 300*a-c* determines according to one example the category of the target 1. According to one embodiment, the sensor 300*a-c* also determines the current speed of the target 1 and the direction of movement of the target 1. According to one example, the current speed is assumed to be the maximum speed of the target 1. According to one example, the terrain in which the target 1 is moving at the first point in time $t_1$ is assumed to be the terrain in which the target 1 will proceed its movement. According to one example, the direction in which the target 1 is moving at the first point in time $t_1$ is assumed to be the direction in which the target 1 will proceed its movement.

Figure 3B:
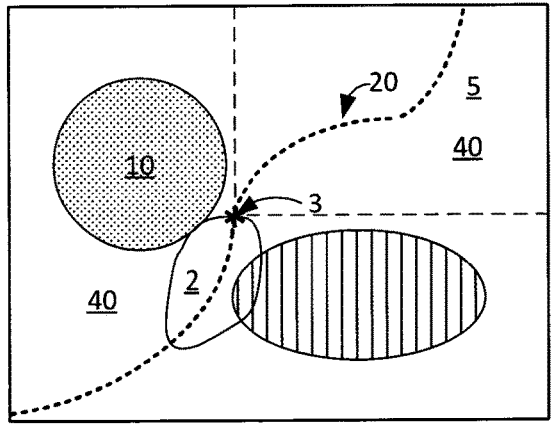
FIG. 3b illustrates a view of an area of land according to one example of the disclosure.

FIG. 3*b* illustrates the same area of land as illustrated in FIG. 3*a*, for a second point in time $t_{21}$. A pattern 2 is illustrated, defining at least one possible geographic position of the target 1 at the second point in time $t_{21}$. The geographical position 3 at which the target 1 was situated at the first point in time $t_1$ is illustrated. According to one example, the pattern 2 is created or generated by means of the central control unit 250. The pattern 2 is created around the geographic position 3 of the target at $t_1$, wherein the dimensions of the pattern 2 are based on at least one of the following parameters; the category of the target 1; the characteristics of the surrounding of the geographic position 3 where the target 1 was detected at said first point in time $t_1$, a time difference between the first point in time $t_1$ and a second point in time $t_2$ for which the pattern 2 is created. According to one example, the dimensions of the pattern 2 are further based on a level of surveillance of the surrounding of the geographic position 3 of the target 1 at said first point in time $t_1$.

According to the illustrated example as mentioned in relation to FIG. 3*a*, the target 1 is able to move in a meadow area 40 and a swamp area 30, but not in a forest area 10, and hence, the pattern 2 does not extend in the forest area 10. In addition, according to the illustrated example, the pattern 2 does not extend in all directions around the geographic position 3 even if the target 1 is able to move in all directions. This is according to one example due to a sensor 300*a-c* of a sensor surveillance system being capable to confirm that the target 1 is not situated in the area 5 above. Alternatively, when generating the pattern 2, it is assumed that the target 1 continues in a travelling direction in which it was travelling at the first point in time $t_1$ and hence the pattern 2 is adjusted accordingly.

According to the illustrated example, the target 1 is able to move in the swamp area 30 at a certain speed, in the meadow area 40 at a certain speed and on the road 20 at a certain speed, but not in a forest area 10. The shape and dimension of the generated pattern 2 at a second point in time $t_2$ will be adjusted accordingly.

According to one example, the pattern 2 is generated continuously. According to one example, the pattern 2 is generated on command, for example by a manual command.

According to one example the pattern 2 is generated in two dimensions.

According to one example the pattern 2 is generated in three dimensions, for example for an airborne or a waterborne target.

The pattern 2 is according to one example generated in real time.

The pattern 2 is according to one example generated in a flexible manner in real time based on at least one of the following parameters: the category of the target 1; the characteristics of the surrounding of the geographic position 3 where the target was detected at said first point in time; the time difference between the first point in time $t_1$ and the second point in time $t_2$.

The pattern 2 is according to one example generated automatically, for example at certain time intervals. The pattern 2 is according to one example generated automatically, for example continuously. Alternatively, the pattern 2 can be generated on request.

The pattern 2 can be generated automatically on the basis of at least one of the following parameters: the category of the target 1; the characteristics of the surrounding of the geographic position 3 where the target 1 was detected at said first point in time $t_1$; the time difference between the first point in time $t_1$ and the second point in time $t_2$.

The pattern 2 can be generated automatically on the basis of a level of surveillance of the surrounding of the geographic position 3 of the target 1 at said first point in time $t_1$.

According to one example, the control unit 250 derives further information regarding the ability of a certain category of the target 1 to travel in certain terrain, the maximum speed of the category of the target in different terrain and/or the maximum acceleration of the category of the target 1 in different terrain. The information can be derived from the central control unit 250 itself and/or from an external control unit and/or from the sensors 300*a-c*. The control unit 250 uses the derived information when generating/creating the pattern 2. According to one example, the control unit 250 derives information regarding the characteristics of the surrounding of the geographic position 3 where the target 1 was detected at said first point in time $t_1$. The control unit 250 uses this derived information when generating/creating the pattern 2. According to one example, the control unit 250 derives information regarding; the time difference between the first point in time $t_1$ and the second point in time $t_2$. The control unit 250 uses this derived information when generating/creating the pattern 2.

In addition, the control unit 250 derives information regarding the level of surveillance of the terrain surrounding the target 1. The control unit 250 uses this derived information when generating /creating the pattern 2.

According to one example, each geographic position in the pattern 2 is associated with a probability of the presence of the target 1 in each geographic position in the pattern 2. The probability of the presence of the target 1 in each geographic position in the pattern 2 could for example be illustrated by different colours of the different positions in the pattern 2, not illustrated.

For example, if the detected target 1, is a car driving on a road 20, the probability according to one example, that the car stays on the road 20 and hence is situated along the road 20 at a second point in time $t_{21}$ is higher that the probability that the car is on a meadow 40, even if the car is able to drive on a meadow 40. This could according to one example be illustrated by making the pattern 2 darker along the road 20 and lighter in the surrounding areas (not illustrated). The probability of the presence of the target in each geographic position in the pattern 2 may be illustrated by other methods than a differing darkness of the positions in the pattern 2.

Figure 3C:
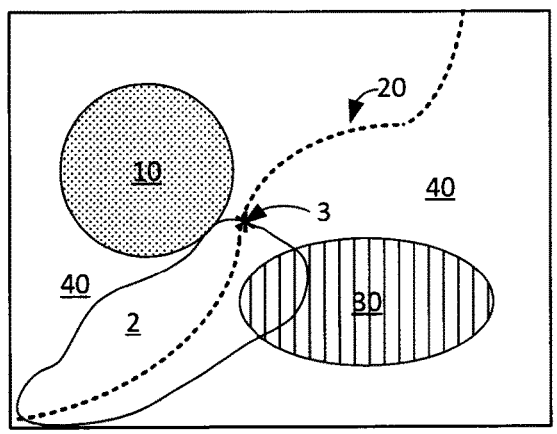
FIG. 3c illustrates a view of an area of land according to one example of the disclosure.

FIG. 3*c* illustrates the same area of land as illustrated in FIGS. 3*a* and 3*b*, and a pattern 2 generated at a different second point in time $t_{22}$. The second point in time $t_{22}$ for which the illustrated pattern 2 is created occurs later in time than the second point in time $t_{21}$ for which the pattern 2 in FIG. 3*b* is generated.

Since more time has passed from the first point in time $t_1$ when the pattern $2_{t21}$ in FIG. 1*b* was generated or created, a larger pattern $2_{t22}$ is generated or created for this second point in time $t_{22}$. The target 1 has possibly moved further away from the geographical position 3 in the time between $t_{21}$ and $t_{22}$ and hence, the pattern 2 generated at $t_{22}$ is larger than the pattern 2 generated at an earlier point in time $t_{21}$.

Figure 3D:
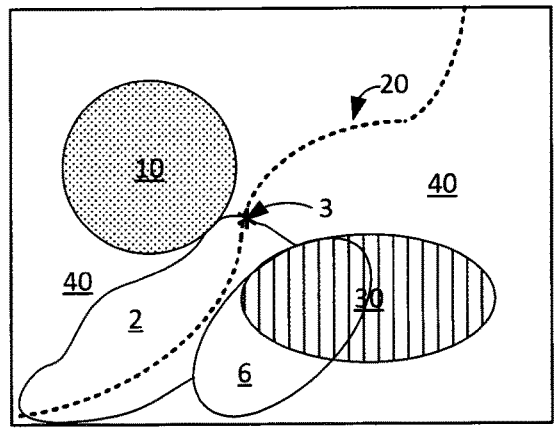
FIG. 3d illustrates a view of an area of land according to one example of the disclosure.

FIG. 3*d* illustrates the same area of land as illustrated in FIG. 3*a*-3*c*, and a pattern 2 generated at the second point in time $t_{22}$. The pattern 2 differs from the pattern 2 illustrated in FIG. 3*c*, even if the same amount of time has passed between the first point in time $t_1$ and the second point in time $t_{22}$ for which the pattern 2 is generated. The shape of the pattern 2 illustrated in FIG. 3*d* differs from the pattern 2 in FIG. 3*c*. The difference is due to at least one sensor 300*a-c* of a sensor surveillance system of a system for estimating the geographic position of a target 1 being present. The sensor 300*a-c* (not illustrated) is capable of determine the characteristics of a target 1, which characteristics at least comprise a geographic position and a category of the target 1 in an area 6, at the time $t_{22}$ for which the pattern 2 was generated. At the time $t_{22}$, the sensor 300*a-c* could not detect a target 1 within the area 6. Hence, in this described example, the pattern 2 does not extend in the area 6 surveilled by the described sensor.

According to one example not illustrated, the target 1 is a flying target and the pattern is a three dimensional pattern created in a volume of air. According to one example not illustrated, the target 1 is a waterborne target and the pattern is a three dimensional pattern created in a volume of water.

Figure 4A:
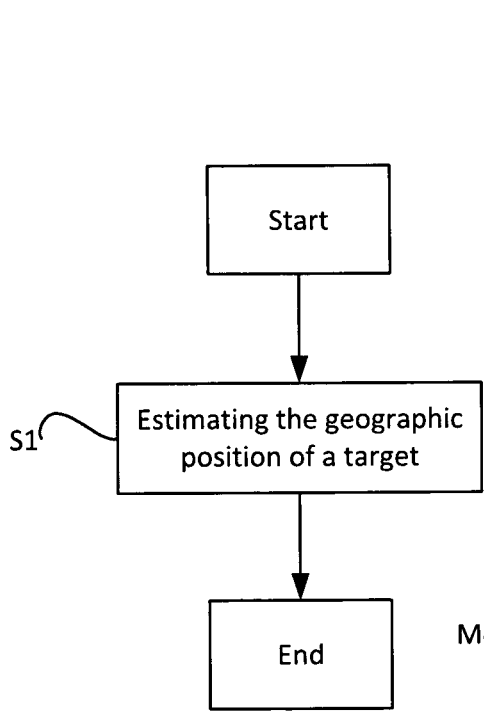
FIG. 4a is a schematic flowchart of a method according to one example of the disclosure.

FIG. 4*a* is a flow chart illustrating a method for estimating the geographic position of a target, according to one embodiment of the present disclosure. In a first step, 51 a method for estimating the geographic position of a target is performed. The method comprises the following steps: detecting a target; determining the characteristics of the target, which characteristics at least comprise a geographic position and a category of the target; tracking the detected target until at least one certain predetermined criteria is not fulfilled, wherein said criteria is associated to the level of certainty for determining the geographic position of the target; and determining a first point in time $t_1$ when the predetermined criteria was last fulfilled. Further, for a second point in time $t_2$ the following step is performed: creating a pattern defining at least one possible geographic position of the target, said pattern extends at least partially around the geographic position of the target at the first point in time, wherein the dimension of said pattern is determined based on at least one predetermined parameter.

Figure 4B:
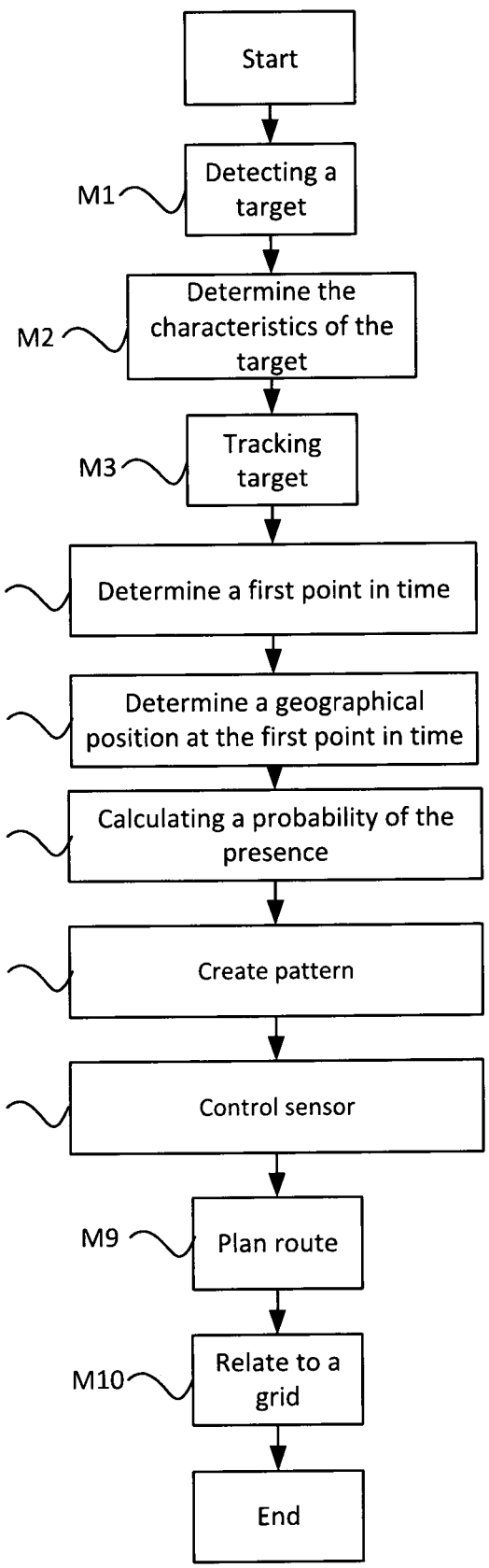
FIG. 4b is a schematic flowchart of a method according to one example of the disclosure.

FIG. 4b is a flow chart illustrating a method for estimating the geographic position of a target 1, according to one example of the present disclosure.

In a first step, M1 a target 1 is detected.

In a second step M2, the characteristics of the target 1 is determined. The characteristics comprise at least the geographic position 3 of the target 1 and a category of the target 1. The category of the target may comprise information regarding the type of the target 1 such as for example a type of vehicle (car, boat, drone, truck etc.) or number of people. The category of the target may further comprise further information regarding the function or appearance of the target such as "broken window", "two passengers", child, 110 cm long etc. In addition, the category of the target 1 could comprise information about the direction and speed at which the target 1 is moving.

In a third step M3, the target 1 is tracked until at least one certain predetermined criteria is not fulfilled, wherein said criteria is associated to the level of certainty for determining the geographic position of the target. In other words, the target 1 is tracked until it can no longer be seen by the sensors 300a-c of a surveillance system 100. In order to define a situation when the target 1 is no longer "seen", certain criteria associated to the level of certainty for determining the geographic position of the target 1 are defined, and when those criteria are no longer fulfilled, the target 1 is considered to no longer be seen.

In a forth step M4, a first point in time, $t_1$ is determined. The first point in time $t_1$, is defined as the last point in time when the criteria were fulfilled, that is, the last point in time when the target 1 was tracked.

In a fifth step M5, a geographic position 3 of the target 1 at $t_1$ is determined according to the method.

In a sixth step M6, according to one example of the method, the probability of the presence of the target 1 at different geographic positions is calculated. The calculation is according to one example based on at least one of: the category of the target 1, the speed at which the target 1 was moving when tracked, the surrounding of the geographic position 3 where the target 1 was last seen, a second point in time $t_2$ at which time the probability of the presence of the target 1 is to be calculated etc.

In a seventh step M7 a pattern 2 is created/generated, which pattern 2 defines at least one possible geographic position of the target 1, said pattern 2 extends at least partially around the geographic position 3, where the target was detected at said first point in time $t_1$, wherein the dimension of said pattern 2 is determined based on at least one predetermined parameter. The pattern 2 is according to one example based on at least one of: the category of the target, the speed at which the target was moving when tracked, the surrounding of the geographic position where the target 1 was last seen, a second point in time $t_2$ at which time the pattern 2 of the target 1 is of interest to view for the user.

In an eight step M8, at least one sensor 300a-c of a sensor surveillance system 100 is controlled based on the pattern 2. According to one example, wherein a sensor 300a-c of the sensor surveillance system 100, which senor 300a-c is capable to detect a target 1 in a surrounding of a certain characteristics is controlled to scan a surrounding comprised in a pattern 2, at least at said geographic positions where a pattern 2 of a target is present.

In a ninth step M9, a route for an object is planned in order to minimize the probability of entering a pattern 2 around a target 1, or in order to minimize the probability of being within a certain distance from a target 1, in order to minimize the risk of encountering a target.

In a tenth step M10, the geographic positions of a pattern for a target are related to a grid.

Figure 5:
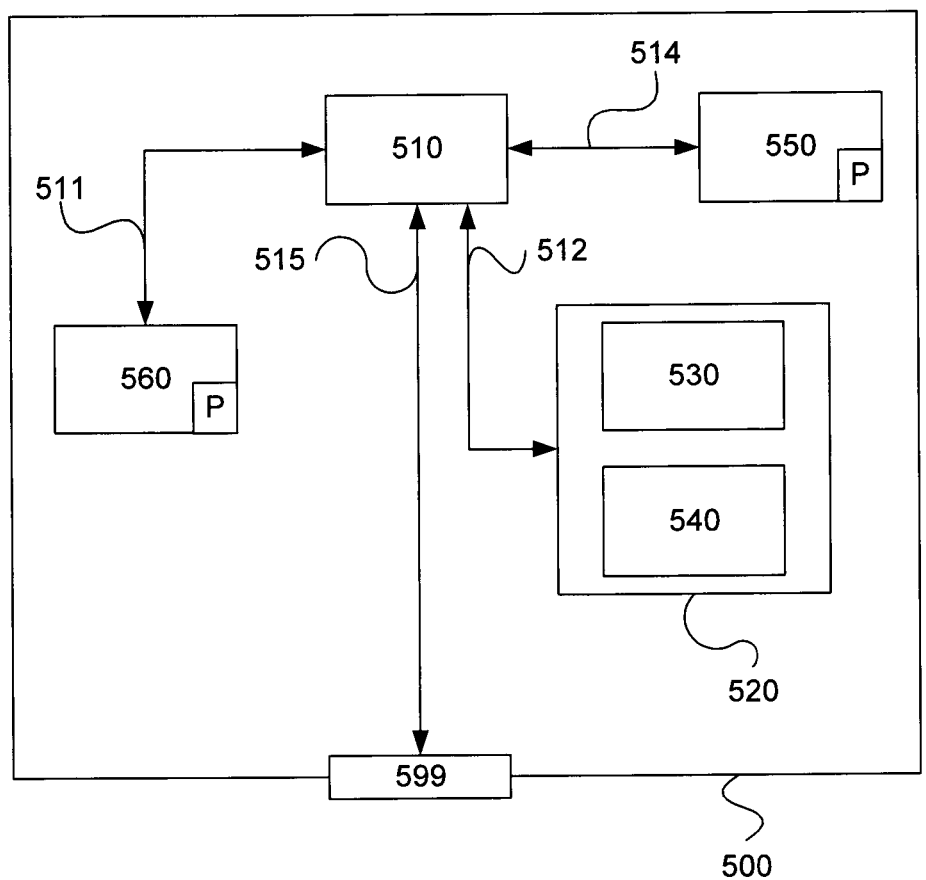
FIG. 5 schematically illustrates a computer according to an embodiment of the invention.

FIG. 5 is a diagram of one version of a device 500. The control units 250 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program P comprises routines for estimating the geographic position of a target.

The computer program P may comprise routines for performing any of the process steps detailed with reference to FIG. 5.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L230, L231, L233, L237, L243 and L253, for example, may be connected to the data port 599.

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, method steps and process steps herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The components and features specified above may within the framework of the invention be combined between different embodiments specified.

The invention claimed is:

1. A method for estimating the geographic position of a target, the method comprises the following steps:
   detecting a target;
   determining at least a geographic position of the target and a category of the target, the category being a target type;
   tracking the detected target until at least one certain predetermined criteria is not fulfilled, wherein said criteria is associated to the level of certainty for determining the geographic position of the target;
   determining a first point in time $t_1$ when the predetermined criteria was last fulfilled, wherein, for a second point in time $t_2$ the following steps are performed:
      creating a pattern defining at least one possible geographic position of the target, said pattern extends at least partially around the geographic position where the target was determined at the first point in time $t_1$, wherein the dimension of said pattern is determined based on at least one predetermined parameter, the at least one predetermined parameter including the target type; and
      calculating a probability of the presence of the target associated with a geographic position in the pattern;
   wherein:
      the method is performed in a system comprising at least one sensor arranged to detect a target, at least one sensor arranged to determine the category of the target, and at least one sensor arranged to track the detected target until at least one certain predetermined criteria is not fulfilled;
      the calculating of the probability of the presence of the target is based on characteristics of the at least one sensor; and
      said at least one predetermined parameter further comprises:
         the characteristics of the surrounding of the geographic position where the target was detected at said first point in time $t_1$; and
         a time difference between the first point in time $t_1$ and the second point in time $t_2$ for which point in time the pattern is created.

2. The method according to claim 1, wherein said predetermined parameter further comprises:
   a level of surveillance of the surrounding of the geographic position of the target at said first point in time $t_1$.

3. The method according to claim 1, wherein the method further comprises the following step:
   calculating a probability of the presence of the target associated with each geographic position in the pattern at said second point in time $t_2$.

4. The method according to claim 1, wherein the at least one sensor of the system is controlled based on the pattern.

5. The method according to claim 3, wherein the at least one sensor of the system is configured to detect the target in a surrounding of a certain characteristic and is controlled to scan said surrounding, at least at said geographic positions where the pattern of the target is present.

6. The method according to claim 1, wherein a route for at least one object is planned based on the pattern that is created.

7. The method according to claim 6, wherein a route for an object is planned in order to minimize the probability of entering the pattern around the target, or in order to minimize the probability of being within a certain distance from the target, in order to minimize the risk of encountering the target.

8. The method according to claim 1, wherein the geographic positions of a pattern for the target are related to a grid.

9. A system for estimating the geographic position of a target wherein said system comprises:
   at least one sensor arranged to detect a target;
   at least one sensor arranged to track the detected target until at least one certain predetermined criteria is not fulfilled, wherein said criteria is associated to a level of certainty for determining a geographic position of the target;
   at least one sensor arranged to determine a category of the target, the category being a target type;
   fulfilment determination circuitry configured to determine a first point in time $t_1$ when the predetermined criteria was last fulfilled;
   characteristic determination circuitry configured to determine at least the geographic position of the target and a category of the target; and
   pattern creation circuitry configured to, for a second point in time $t_2$, perform the following steps:
      creating a pattern defining possible geographic positions of the target, wherein said pattern extends at least partially around the geographic position where the target was determined at the first point in time $t_1$, wherein the dimension of said pattern is determined based on at least one predetermined parameter, the at least one predetermined parameter including the target type, the at least one predetermined parameter further comprising: the characteristics of the surrounding of the geographic position where the target was detected at said first point in time $t_1$; and a time difference between the first point in time $t_1$ and the second point in time $t_2$ for which point in time the pattern is created; and
      calculating a probability of the presence of the target associated with a geographic position in the pattern based on characteristics of the utilized sensor.

10. The system according to claim 9, wherein said predetermined parameter further comprises:
    a level of surveillance of the surrounding of the geographic position of the target at said first point in time $t_1$.

11. The system according to claim 10, wherein the system further comprises probability calculator circuitry arranged to:
    calculate a probability of the presence of the target associated with each geographic position in the pattern at said second point in time $t_2$.

12. The system according to claim 9, further comprising sensor controlling circuitry arranged to control the at least one sensor of the system based on the pattern.

13. The system according to claim 12, wherein the at least one sensor configured to detect the target in a surrounding of a certain characteristic is controlled to scan said surrounding, at least at said geographic positions where the pattern of the target is present.

14. The system according to claim 9, wherein the system comprises means arranged to plan a route for at least one object based on the created pattern.

15. The system according to claim 14, wherein a route for an object is planned in order to minimize the probability of entering the pattern around the target, or in order to minimize the probability of being within a certain distance from the target, or in order to minimize the risk of encountering the target.

* * * * *